(12) United States Patent
Bossemeyer, Jr. et al.

(10) Patent No.: US 10,230,537 B2
(45) Date of Patent: Mar. 12, 2019

(54) HOME GATEWAY SYSTEM WITH TELEPHONY FUNCTIONS AND METHOD

(71) Applicant: AT&T Intellectual Property I, L.P., Atlanta, GA (US)

(72) Inventors: Robert Wesley Bossemeyer, Jr., St. Charles, IL (US); Raymond Walden Bennett, III, Naperville, IL (US); Donald Bernard Liebrecht, West Dundee, IL (US); Barry James Sullivan, Long Grove, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 357 days.

(21) Appl. No.: 15/053,749

(22) Filed: Feb. 25, 2016

(65) Prior Publication Data

US 2016/0373271 A1     Dec. 22, 2016

Related U.S. Application Data

(60) Continuation of application No. 11/326,307, filed on Jan. 5, 2006, now Pat. No. 9,294,629, which is a
(Continued)

(51) Int. Cl.
| | |
|---|---|
| *H04L 12/28* | (2006.01) |
| *H04M 1/57* | (2006.01) |
| *H04M 1/64* | (2006.01) |
| *H04M 1/663* | (2006.01) |
| *H04M 15/06* | (2006.01) |

(Continued)

(52) U.S. Cl.
CPC .......... *H04L 12/2818* (2013.01); *H04M 1/57* (2013.01); *H04M 1/578* (2013.01); *H04M 1/642* (2013.01); *H04M 1/663* (2013.01); *H04M 3/42059* (2013.01); *H04M 3/4288* (2013.01); *H04M 3/533* (2013.01); *H04M 15/06* (2013.01);
(Continued)

(58) Field of Classification Search
CPC .................................................. H04L 12/2818
See application file for complete search history.

(56) References Cited

U.S. PATENT DOCUMENTS

| | | | |
|---|---|---|---|
| 5,291,479 | A | 3/1994 | Vaziri et al. |
| 5,469,496 | A | 11/1995 | Emery et al. |
| 5,475,735 | A | 12/1995 | Williams et al. |
| 5,479,491 | A | 12/1995 | Herrero Garcia et al. |
| 5,526,413 | A | 6/1996 | Cheston, III et al. |
| 5,528,285 | A | 6/1996 | Morikawa et al. |

(Continued)

OTHER PUBLICATIONS

United States Patent and Trademark Office, "Notice of Allowance and Fee(s) Due", issued for U.S. Appl. No. 10/228,533, dated Nov. 4, 2005, 7 pages. (Not included as is part of PTO records).

(Continued)

*Primary Examiner* — Joseph T Phan
(74) *Attorney, Agent, or Firm* — Hanley Flight & Zimmerman, LLC

(57) ABSTRACT

A home gateway system has a transceiver (70) capable of establishing a wireless local loop connection (72). A voice processing system (74) is coupled to the transceiver (70). The voice processing system (74) is capable of storing a message from an incoming call.
A caller identification processing system (76) is coupled to the transceiver (70). The caller identification processing system (76) determines a telephone number of the incoming call and routes the incoming call to the voice processing system (74), if the telephone number belongs to a screened group of telephone numbers.

14 Claims, 14 Drawing Sheets

Related U.S. Application Data continuation of application No. 10/228,533, filed on Aug. 27, 2002, now Pat. No. 7,027,566, which is a division of application No. 09/061,833, filed on Apr. 16, 1998, now abandoned.

(51) Int. Cl.
  *H04M 3/42* (2006.01)
  *H04M 3/428* (2006.01)
  *H04M 3/533* (2006.01)
  *H04W 84/14* (2009.01)

(52) U.S. Cl.
  CPC .... *H04M 2201/39* (2013.01); *H04M 2201/41* (2013.01); *H04W 84/14* (2013.01)

(56) References Cited

U.S. PATENT DOCUMENTS

| | | | |
|---|---|---|---|
| 5,528,666 A | 6/1996 | Weigand et al. | |
| 5,550,649 A | 8/1996 | Wong et al. | |
| 5,555,258 A | 9/1996 | Snelling et al. | |
| 5,559,860 A | 9/1996 | Mizikovsky | |
| 5,572,572 A | 11/1996 | Kawan et al. | |
| 5,592,538 A | 1/1997 | Kosowsky | |
| 5,598,456 A | 1/1997 | Feinberg | |
| 5,602,837 A | 2/1997 | Takahashi | |
| 5,603,095 A | 2/1997 | Uola | |
| 5,610,972 A | 3/1997 | Emery et al. | |
| 5,640,192 A | 6/1997 | Garfinkle | |
| 5,640,444 A | 6/1997 | O'Sullivan | |
| 5,644,629 A | 7/1997 | Chow | |
| 5,664,003 A | 9/1997 | Foldare et al. | |
| 5,689,568 A | 11/1997 | Laborde | |
| 5,715,370 A | 2/1998 | Luther et al. | |
| 5,768,356 A | 6/1998 | McKendry et al. | |
| 5,781,625 A | 7/1998 | Sizer, II | |
| 5,793,413 A | 8/1998 | Hylton et al. | |
| 5,812,649 A | 9/1998 | Shen | |
| 5,875,232 A | 2/1999 | Wolf | |
| 5,905,774 A * | 5/1999 | Tatchell | H04M 3/42204 379/88.01 |
| 5,987,061 A | 11/1999 | Chen | |
| 6,021,324 A | 2/2000 | Sizer, II et al. | |
| 6,026,149 A | 2/2000 | Fuller et al. | |
| 6,029,064 A | 2/2000 | Farris et al. | |
| 6,047,006 A | 4/2000 | Brakefield et al. | |
| 6,047,060 A | 4/2000 | Fedorov et al. | |
| 6,058,104 A | 5/2000 | Snelling et al. | |
| 6,085,080 A | 7/2000 | Rahikainen et al. | |
| 6,104,909 A | 8/2000 | Baldwin et al. | |
| 6,125,127 A | 9/2000 | Smith, Jr. | |
| 6,141,356 A | 10/2000 | Gorman | |
| 6,185,283 B1 | 2/2001 | Fuller et al. | |
| 6,223,054 B1 | 4/2001 | Katko | |
| 6,327,343 B1 | 12/2001 | Epstein et al. | |
| 6,385,303 B1 | 5/2002 | Peterson et al. | |
| 6,529,586 B1 | 3/2003 | Elvins et al. | |
| 6,798,868 B1 | 9/2004 | Montgomery et al. | |
| 6,954,524 B2 | 10/2005 | Gibson | |
| 7,027,566 B2 | 4/2006 | Bossemeyer et al. | |
| 7,394,682 B2 | 7/2008 | Ostermayr et al. | |
| 7,433,457 B2 | 10/2008 | Marwell et al. | |
| 7,596,129 B2 | 9/2009 | Bossemeyer, Jr. et al. | |
| 2002/0168055 A1 | 11/2002 | Crockett et al. | |
| 2003/0228011 A1 | 12/2003 | Gibson | |
| 2006/0140356 A1 | 6/2006 | Bossemeyer et al. | |

OTHER PUBLICATIONS

United States Patent and Trademark Office', Final Office Action, issued for U.S. Appl. No. 10/228,533, dated Jul. 27, 2005, 9 pages. (Not included as is part of PTO records).

United States Patent and Trademark Office, "Final Office Action", issued for U.S. Appl. No. 10/228,533, dated May 4, 2005, 8 pages. (Not included as is part of PTO records).

United States Patent and Trademark Office, "Non-Final Office Action", issued for U.S. Appl. No. 10/228,533, dated Oct. 20, 2004, 8 pages. (Not included as is part of PTO records).

United States Patent and Trademark Office, "Non-Final Office Action", issued for U.S. Appl. No. 10/228,533, dated Dec. 19, 2003, 11 pages. (Not included as is part of PTO records).

United States Patent and Trademark Office, "Non-Final Office Action", issued for U.S. Appl. No. 09/061,833, dated Jun. 10, 2002, 18 pages. (Not included as is part of PTO records).

United States Patent and Trademark Office, "Non-Final Office Action", issued for U.S. Appl. No. 09/061,833, dated Dec. 7, 2001, 17 pages. (Not included as is part of PTO records).

United States Patent and Trademark Office, "Final Office Action", issued for U.S. Appl. No. 09/061,833, dated Jun. 28, 2001, 17 pages. (Not included as is part of PTO records).

United States Patent and Trademark Office, "Non-Final Office Action", issued for U.S. Appl. No. 09/061,833, dated May 8, 2001, 15 pages. (Not included as is part of PTO records).

United States Patent and Trademark Office, "Final Office Action", issued for U.S. Appl. No. 09/061,833, dated Jan. 24, 2001, 13 pages. (Not included as is part of PTO records).

United States Patent and Trademark Office, "Non-Final Office Action", issued for U.S. Appl. No. 09/061,833, dated Oct. 25, 2000, 15 pages. (Not included as is part of PTO records).

United States Patent and Trademark Office, "Non-Final Office Action", issued for U.S. Appl. No. 09/061,833, dated Jul. 18, 2000, 15 pages. (Not included as is part of PTO records).

Reitman, "AT&T Announces Fixed Wireless Alternative to Local Service", Edge Publishing, vol. 12, Mar. 3, 1997, pp. 1-5. (Copy not provided as previously provided in U.S. Appl. No. 09/061,833, to which priority is claimed).

Web page: <<http://www.state.az.us/tpo/new/report/com_tele.html>> (Copy not provided as previously provided in U.S. Appl. No. 09/061,833, to which priority is claimed).

Web Page: <http://www.att.com/community guide.bpdiagrams, 5/97>> (Copy not provided as previously provided in U.S. Appl. No. 09/061,833, to which priority is claimed).

Lucent Technologies, "Bell Labs Trends and Development", ed. Patrick Regan, vol. 1, Apr. 1997, pp. 1-11. (Copy not provided as previously provided in U.S. Appl. No. 09/061,833, to which priority is claimed).

Web Page: <<http://www.cdg.org/cdmaone.html>> (Copy not provided as previously provided in U.S. Appl. No. 09/061,833, to which priority is claimed).

The Yankee Group, "Consumer Communications", Bullitan vol. 14, No. 2, Mar. 1997. (Copy not provided as previously provided in U.S. Appl. No. 09/061,833, to which priority is claimed).

United States Patent and Trademark Office, "Advisory Action", issued for U.S. Appl. No. 10/228,533, dated Jul. 1, 2005, 3pages. (Not included as is part of PTO records).

United States Patent and Trademark Office, "Advisory Action", issued for U.S. Appl. No. 09/061,833, dated Aug. 27, 2001, 6 pages. (Not included as is part of PTO records).

United States Patent and Trademark Office, "Advisory Action", issued for U.S. Appl. No. 09/061,833, dated Mar. 5, 2001, 3 pages. (Not included as is part of PTO records).

United States Patent and Trademark Office, "Non-Final Office Action", issued for U.S. Appl. No. 11/326,307, dated Apr. 6, 2011, 12 pages. (Not included as is part of PTO records).

United States Patent and Trademark Office, "Final Office Action", issued for U.S. Appl. No. 11/326,307, dated May 10, 2012, 12 pages. (Not included as is part of PTO records).

United States Patent and Trademark Office, "Non-Final Office Action", issued for U.S. Appl. No. 11/326,307, dated Jun. 18, 2013, 23 pages. (Not included as is part of PTO records).

United States Patent and Trademark Office, "Final Office Action", issued for U.S. Appl. No. 11/326,307, dated Jan. 29, 2014, 10 pages. (Not included as is part of PTO records).

United States Patent and Trademark Office, "Non-Final Office Action", issued for U.S. Appl. No. 11/326,307, dated Oct. 2, 2014, 4 pages. (Not included as is part of PTO records).

(56) References Cited

OTHER PUBLICATIONS

United States Patent and Trademark Office, "Final Office Action", issued for U.S. Appl. No. 11/326,307, dated Jun. 4, 2015, 11 pages. (Not included as is part of PTO records).
United States Patent and Trademark Office, "Advisory Action", issued for U.S. Appl. No. 11/326,307, dated Aug. 6, 2015, 4 pages. (Not included as is part of PTO records).
United States Patent and Trademark Office, "Notice of Allowance", issued for U.S. Appl. No. 11/326,307, dated Nov. 17, 2015, 20 pages. (Not included as is part of PTO records).

* cited by examiner

US 10,230,537 B2

HOME GATEWAY SYSTEM WITH TELEPHONY FUNCTIONS AND METHOD

PRIORITY CLAIM AND CROSS REFERENCE TO RELATED APPLICATIONS

This patent arises from a continuation of U.S. patent application Ser. No. 11/326,307, filed Jan. 5, 2006, now U.S. Pat. No. 9,294,629, which is a continuation of U.S. patent application Ser. No. 10/228,533, filed Aug. 27, 2002, now U.S. Pat. No. 7,027,566, which is a divisional of U.S. patent application Ser. No. 09/061,833, filed on Apr. 16, 1998. Priority to U.S. patent application Ser. Nos. 11/326,307, 10/228,533 and 09/061,833 is claimed. Each of the forgoing patent applications is hereby incorporated herein by reference in its entirety.

FIELD OF THE INVENTION

The present invention relates to communication devices and more particularly to a home gateway system with telephony functions and method.

BACKGROUND OF THE INVENTION

Home owners often have a variety of machines and services for handling telephone functions such as answering machines or voice mail, caller ID, call waiting, three way calling, call forwarding, and voice dialing. Presently, these services are performed either by a variety of machines the user has to buy or by the telephony network or some combination of both. The customer is often confused by all these choices and machines. In addition, this disjointed approach does not allow the user to combine these functions, for instance a user cannot have selected incoming calls routed to his answer machine or voice mail. In addition, the present approach does not allow the user to combine his telephony services with his other communication services, such as the internet or television delivery services.

Thus there exists a need for a home gateway system with telephony functions that can integrate the functions of the various telephone services and machines and provides an intelligent interface to other communication services.

DETAILED DESCRIPTION OF THE DRAWINGS

A home gateway system has a transceiver that is capable of establishing a wireless local loop connection. A voice processing system is coupled to the transceiver. The voice processing system is capable of storing a message from an incoming call. A caller identification processing system is coupled to the transceiver. The caller identification processing system determines a telephone number of the incoming call. Routing the incoming call to the voice processing system if the telephone number belongs to a screened group of telephone numbers.

The home gateway system combines the functions of a number of commonly used telephone and communication devices. By combining these devices new functions can be provided. For instance, an incoming call can be identified by a caller ID system and a switch can be used to route these calls to a voice mail system. Numerous other advantages and synergy's will become apparent in the appended specification.

Figure 1:
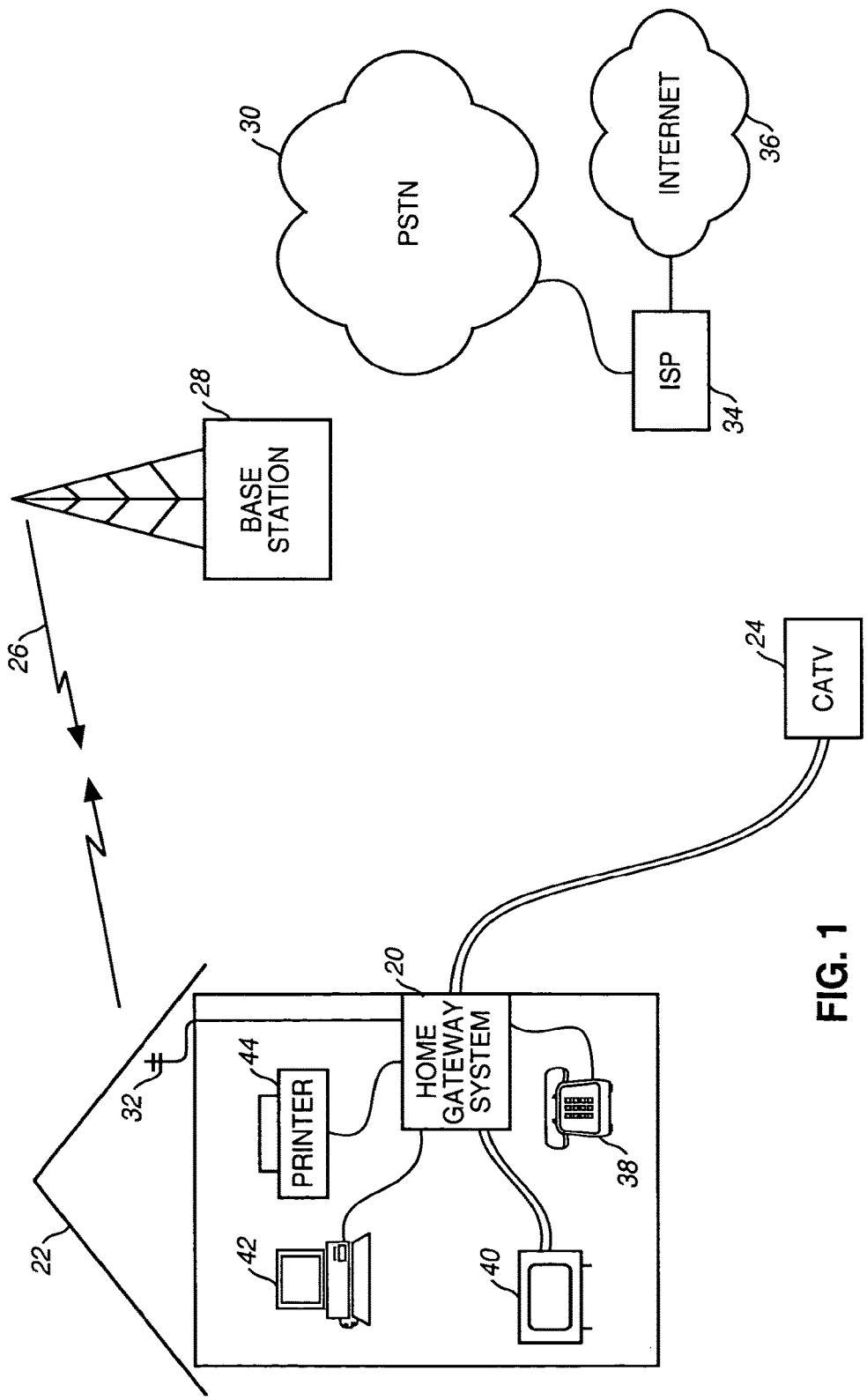
FIG. 1 is a schematic diagram of a home gateway system with telephony functions connected to a variety communication carriers in accordance with one embodiment of the invention.

FIG. 1 is a schematic diagram of a home gateway system 20 with telephony functions connected to a variety communication carriers in accordance with one embodiment of the invention. The home gateway system 20 is located inside a house 22. The home gateway system 20 has an input to receive a cable television (satellite, XDSL, ADSL) 24 input signal. The home gateway system 20 is also connected by a wireless local loop 26 and a base station 28 to the public switch telephone network (PSTN) 30. The antenna 32 for the wireless local loop 26 is shown in the attic of the house. The PSTN 30 provides access to an internet service provider (ISP) 34, which provides access to the internet 36. A telephone 38, television 40, computer 42 and printer 44 can all be connected to the home gateway system 20. The home gateway system 20 allows the computer 42 to talk to the printer 44 or to the ISP 34. The telephone 38 can place a standard telephone call over the PSTN 30 or place a data telephone call over the internet 36.

Figure 2:
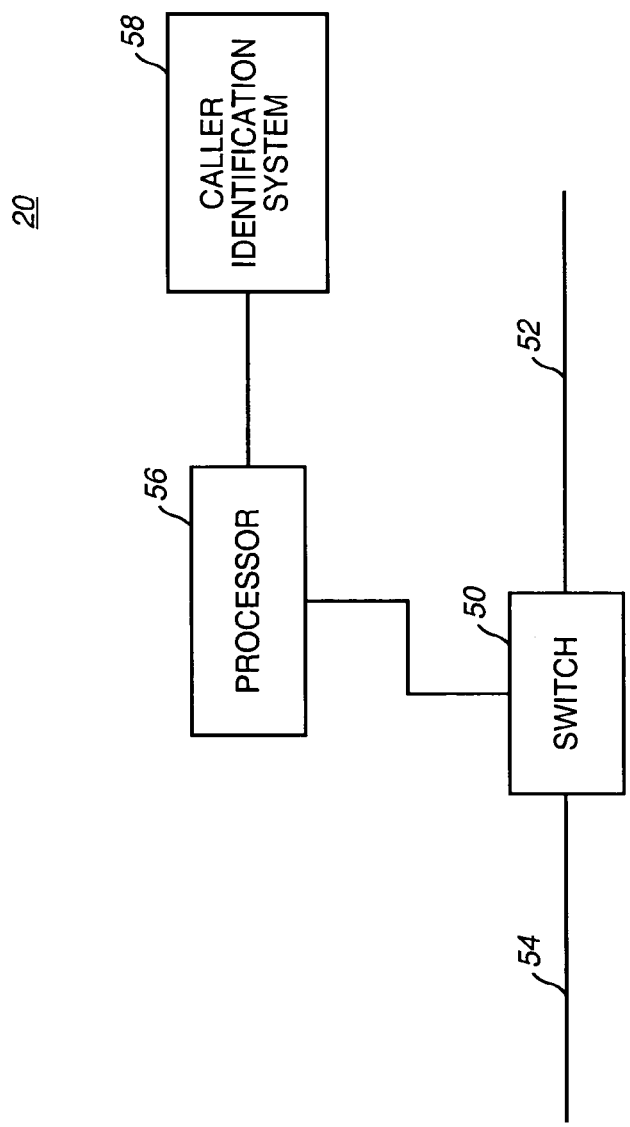
FIG. 2 is a block diagram of a home gateway system with telephony functions in accordance with one embodiment of the invention.

FIG. 2 is a block diagram of a home gateway system 20 with telephony functions in accordance with one embodiment of the invention. In this embodiment a switch 50 is connected to an external telephony channel 52 and an internal telephony channel (plurality of internal telephone lines) 54. In one embodiment the external telephony channel 52 is an xDSL (Digital Subscriber Line) link with a central office, such as an ADSL (Asymmetrical digital Subscriber Line) Link. The xDSL link provides one or more derived digital voice channels as described in the copending application, U.S. Ser. No. 08/742,164, entitled "Method and Apparatus for Providing a derived Digital Telephone Voice Channel", filed on Nov. 1, 1996, assigned to the same assignee as the present invention and the subject matter which is incorporated herein by reference thereto. The external telephony channel 52 using the invention described in the above referenced application provides a plurality of digital derived telephone channels and a data channel of such an ADSL link. A processor 56 is connected to the switch 50. The processor (controller) 56 sends and receives messages from the switch 50. A caller identification system 58 is connected to the processor 56. The caller identification system 58 receives an identify query from the processor 56. Once the incoming telephone call number has been identified the switch can route the call based on some predetermined criteria. For instance, calls not on a preferred list could be routed to a voice mail box. In this embodiment the home gateway system 20 can be connected to a standard telephone line.

In one embodiment, the switch 50 allows the owners to make "intercom" type calls. When an intercom call command (e.g., dialing an internal extension) is received, the calling line is connected with another internal phone line. In another embodiment the switch acts as an electronic receptionist. The caller is given a plurality of options (e.g., users' extensions) and the switch routes the incoming call to one of the plurality of internal telephone lines based on the caller response.

Figure 3:
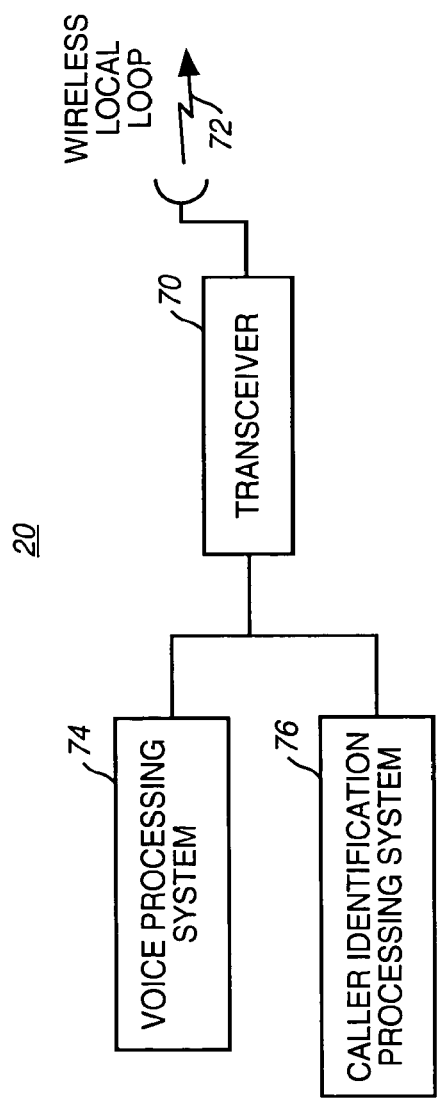
FIG. 3 is a block diagram of a home gateway system with telephony functions in accordance with one embodiment of the invention.

FIG. 3 is a block diagram of a home gateway system 20 with telephony functions in accordance with one embodiment of the invention. In this embodiment the home gateway system 20 has a transceiver 70 capable of establishing a wireless local loop connection 72. A voice processing system 74 is coupled to the transceiver 70. The voice processing system 74 is capable of storing a message from an incoming call. A caller identification processing system 76 is coupled to the transceiver 70. The caller identification processing system 76 determines a telephone number of the incoming call. If the telephone number belongs to a screened group of telephone numbers, routing the incoming call to the voice processing system 74. The voice processing system 74, in one embodiment, provides a list of voice synthesized options to the caller. For instance, the voice processing system might announce the voice mail boxes for each member of the family. In one embodiment, the user may be asked to speak the name of the family member they wish to leave a message. A speech recognition unit in the voice processing system 74 then recognizes the spoken name and connects the caller with the family member's voice mail box.

In one embodiment, the home gateway system has a processor coupled to the transceiver 70. The processor determines if an incoming call is received during an existing call. When the incoming call is received during an existing call, an indicia is posted of the incoming call to a user. The indicia can be a light, or a beep over a speaker separate from the telephone line. This provides the user the functionality of call waiting without the obnoxious beep during the telephone conversation.

Figure 4:
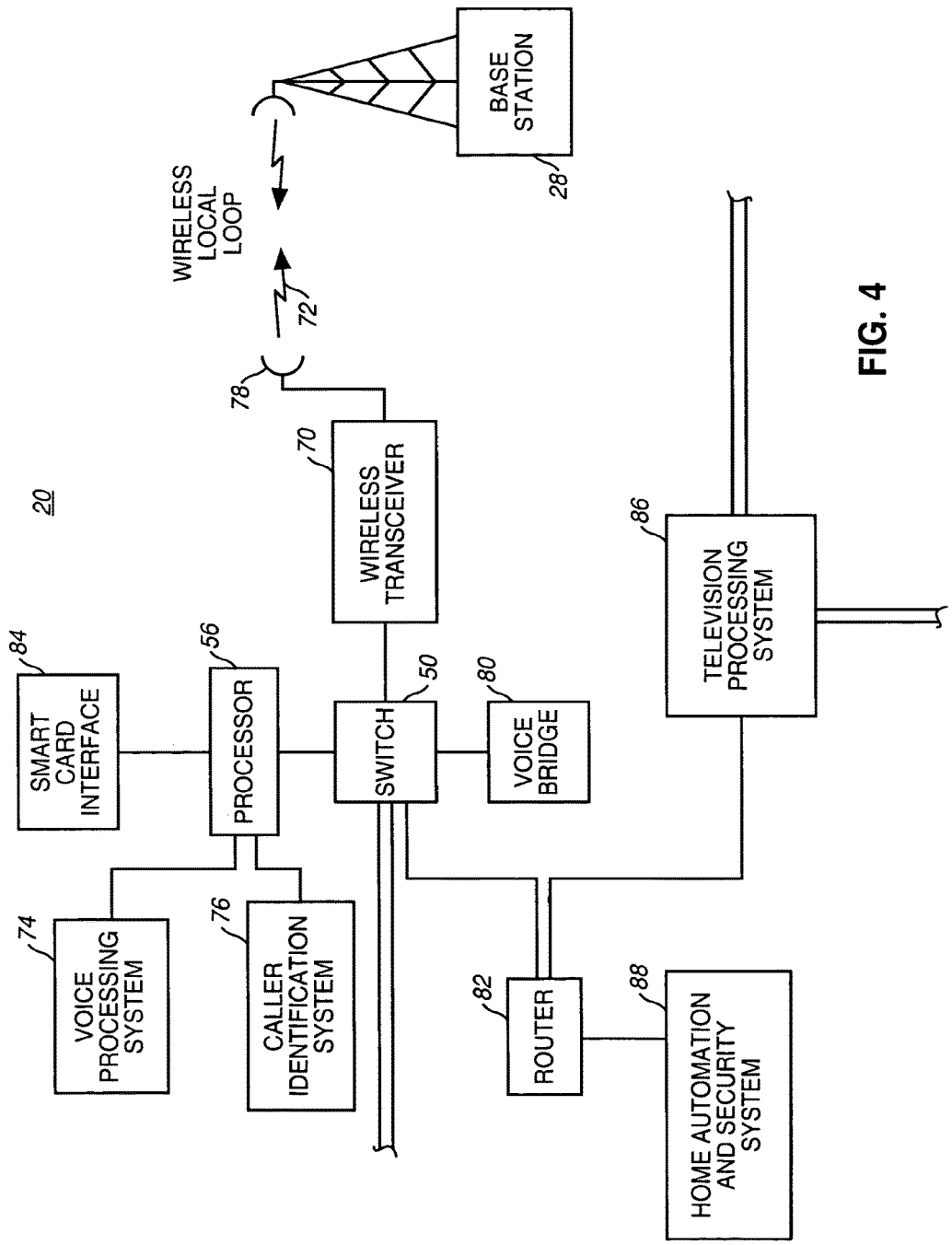
FIG. 4 is a block diagram of a home gateway system with telephony functions in accordance with one embodiment of the invention.

FIG. 4 is a block diagram of a home gateway system 20 with telephony functions in accordance with one embodiment of the invention. A wireless transceiver 70 has an antenna 78 and is capable of establishing a wireless local loop 72 connection with a base station 28. A wireless local loop is a telephony connection between the PSTN (telephony network) and a subscriber's home. The wireless local loop is an alternative to a standard wired local loop connection. A single base station 28 will generally cover an entire neighborhood. In one embodiment the base station 28 to subscriber link is a point to multi-point (broadcast) link.

The link from the subscriber's house to the base station 28 is a point to point link. These links are not mobile links, but geographically stable. This simplifies the processing of a wireless local loop compared to a mobile (cellular, PCS) telephone link and allows for lower cost, higher quality telephone links. In one embodiment, the home gateway system includes a display. The display is used by the caller ID system to display numbers and can be used for other displays.

The wireless transceiver 70 is connected to a switch 50 as in the previous embodiments. The switch 50 in this case is connected to a voice bridge 80, as well as the processor 56 and the router 82. The processor 56 is connected to a smart card interface 84, a voice processing system 74 and a caller identification system 76. The router 82 is connected to the television processing system 86 and to a home automation and security system 88. The router 82 is used to route computer data among computer devices also.

The smart card interface 84 is used to store and download (setup instructions) various user preferences or setups. The voice processing system 74 includes a complete voice mail system and a voice recognition and speech synthesis system. The voice processing system 74 in combination with the switch acts as an electronic receptionist for an incoming phone call. In addition, the voice processing system is used for voice activated dialing. The caller identification system 76 logs incoming calls and is used for call screening. In one embodiment all calls not on a preferred list are routed to the voice mail of the voice processing system 84. This requires the switch 50 to query the processor 56 on how to route incoming calls. The voice bridge 80 is used to setup three way calls (conference calls).

The home automation and security system 88 can send messages through the router 82 to a computer, television processing system 86 or have the wireless transceiver 70 place a call to emergency personnel. The television processing system 86 receives a plurality of television signals from a cable. The smart card interface 84 is used to setup the various appliances and to turn on or off lights. A user can call in commands to the home automation and security system 88 by using the speech recognition technology of the voice processing system 74. The voiced command is recognized and converted into a data command that the home automation and security system 88 understands. In one embodiment the user's voice is authenticated by a speaker recognition system in the voice processing system 74, before a voiced command will be obeyed.

Figure 5:
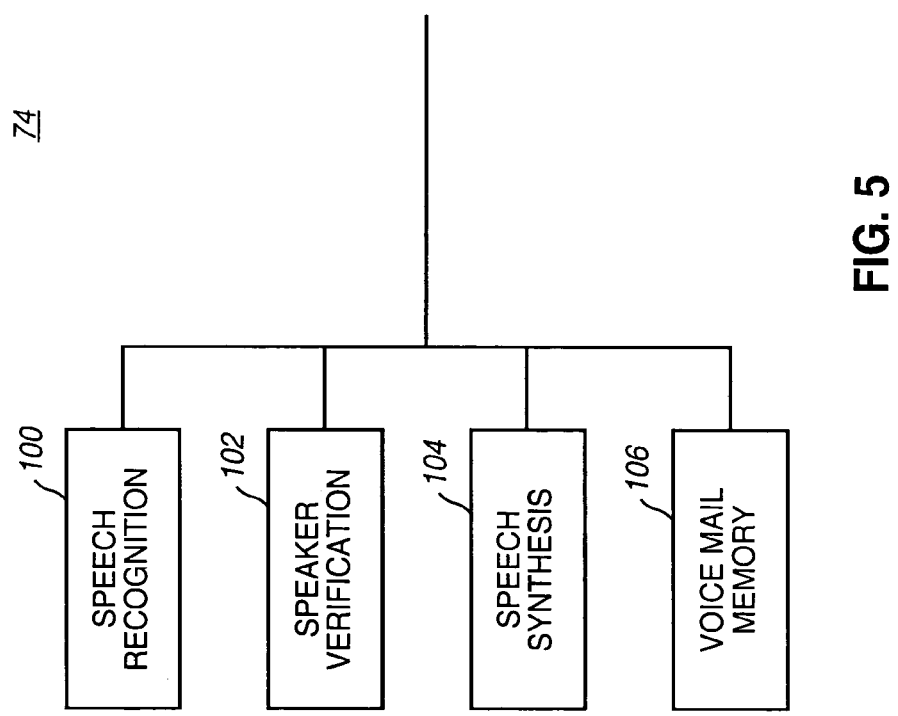
FIG. 5 is a block diagram of a voice processing system used in a home gateway system with telephony functions in accordance with one embodiment of the invention.

FIG. 5 is a block diagram of a voice processing system 74 used in a home gateway system with telephony functions in accordance with one embodiment of the invention. The voice processing system 74 contains a speech recognition system 100, a speaker verification system 102, a speech synthesis system 104 and a voice mail memory system 106.

The control of the systems of the voice processing system 74 is performed in one embodiment by the processor 56. The processor 56 coordinates the voice system 100-106 to provide machine reception and voice mail capabilities for instance.

Figure 6:
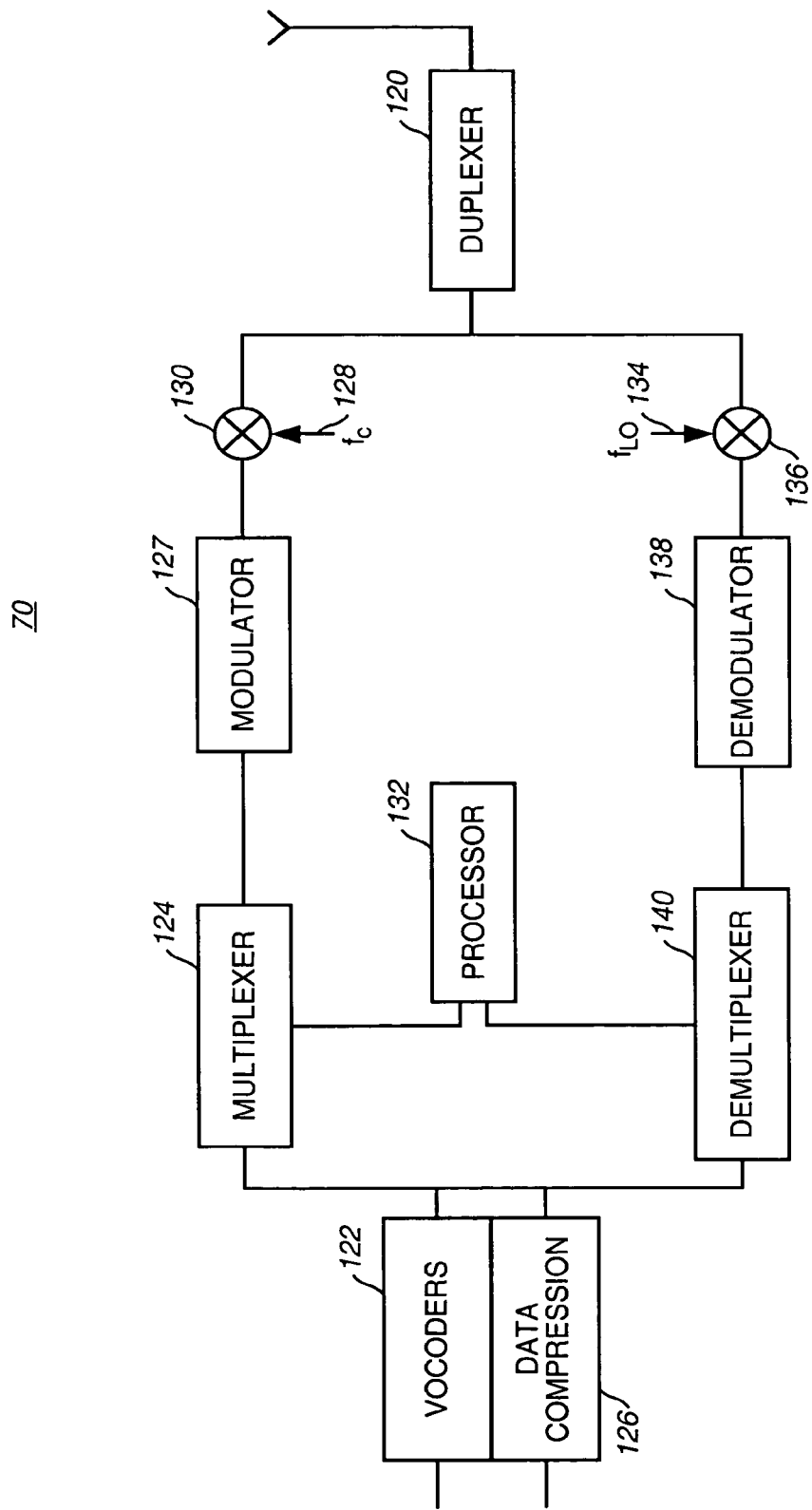
FIG. 6 is a block diagram of a transceiver used in a home gateway system with telephony functions in accordance with the one embodiment of the invention.

FIG. 6 is a block diagram of a transceiver 70 used in a home gateway system with telephony functions in accordance with the one embodiment of the invention. The transceiver 70 has a duplexer 120 that isolates the incoming signals from the outgoing signals based on their frequencies. Outgoing analog voice signals are first encoded by a vocoder 122. The vocoder 122 converts the analog voice signal to a digital voice signal. Some outgoing signals will be digital signals, if for instance the user is using a digital cordless telephone in the house. Digital voice signals will generally be passed on to the multiplexer 124, however in some circumstances the digital voice signal is compressed by a data compression circuit 126. When the signal is a data signal it may also be compressed. All the outgoing signals are then multiplexed together by the multiplexer 124. The multiplexer 124 in one embodiment time division multiplexes the outgoing signals. In another embodiment, the multiplexer 124 wavelength division multiplexes the outgoing signals. In another embodiment, the multiplexer 124 code division multiplexes the signals. The particular multiplexing scheme that is used depends on the requirements of the wireless local loop. The outgoing signals are then modulated by the modulator 127. Then the outgoing signals are up converted by a carrier signal 128 at a mixer 130. A processor 132 controls the multiplexer 124 and receives certain control information.

The incoming signals are first down converted by a local oscillator signal 134 at the mixer 136. The incoming signals are then demodulated (demodulated output) by a demodulator 138. A demultiplexer 140 then demultiplexes the incoming signals. When the incoming signals are compressed, they are expanded by the data compression circuit 126. When a digitized voice signal needs to be converted to an analog voice signal, the vocoders 122 perform this function. The incoming signals are then passed to the switch.

Figure 7:
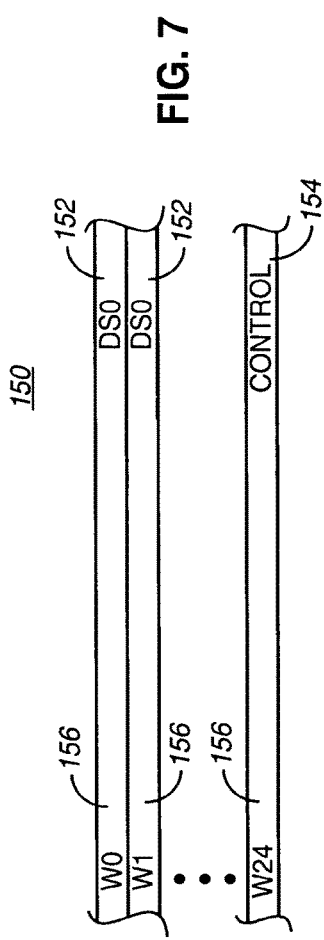
FIG. 7 is a schematic diagram of a wavelength division multiplexing scheme used in a home gateway system in accordance with one embodiment of the invention.

FIG. 7 is a schematic diagram of a wavelength division multiplexing scheme 150 used in a home gateway system in accordance with one embodiment of the invention. The diagram shows a plurality of wavelength division multiplexed channels 152 and a control channel 154 carried by separate wavelengths (frequencies) W0 through W24 156.

Figure 8:
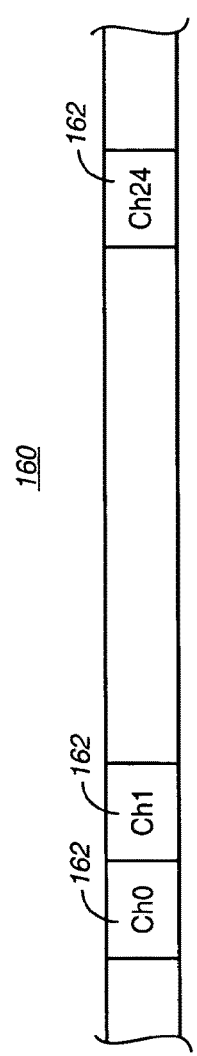
FIG. 8 is a schematic diagram of a time division multiplexing scheme used in a home gateway system in accordance with one embodiment of the invention.

FIG. 8 is a schematic diagram of a time division multiplexing scheme 160 used in a home gateway system in accordance with one embodiment of the invention. The diagram shows a plurality of time division multiplexed channels (ch0, ch1, . . . ch24) 162 carried at different time slots (T0, T1, . . . T24).

Figure 9:
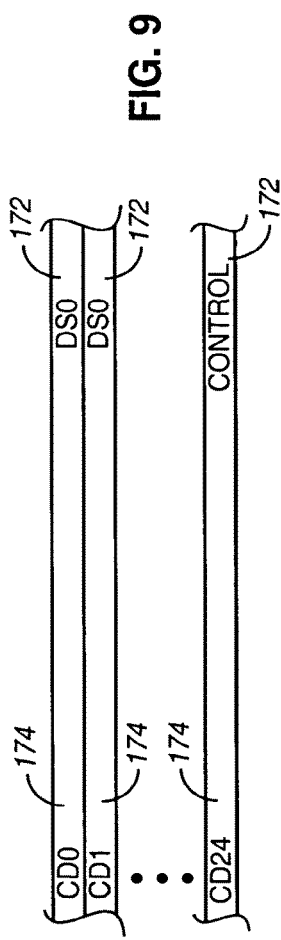
FIG. 9 is a schematic diagram of a code division multiplexing scheme used in a home gateway system in accordance with one embodiment of the invention.

FIG. 9 is a schematic diagram of a code division multiplexing scheme 170 used in a home gateway system in accordance with one embodiment of the invention. The diagram shows a plurality of channels 172 carried on different codes (CD0, CD1 . . . CD24) 174. The codes are used to modulate the channels and the channels can be recovered by demodulating with the appropriate codes. Commonly the wireless local loop would have two to four voice channels and a control channel.

Figure 10:
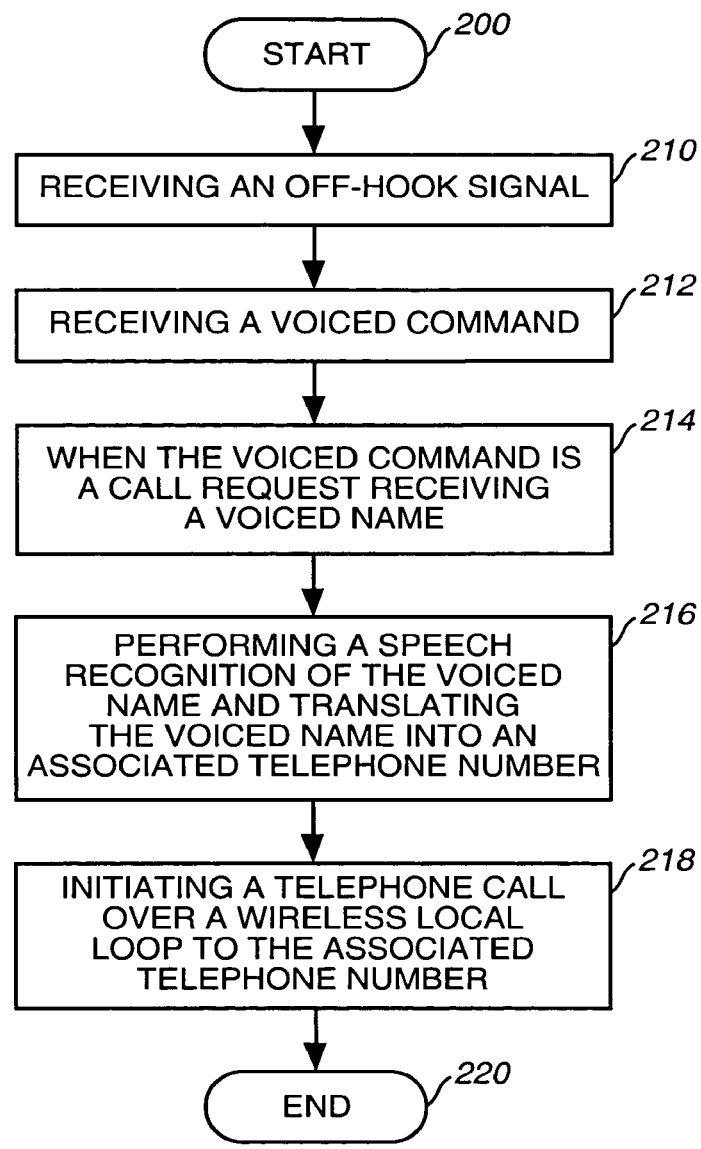
FIG. 10 is a flow chart of a process of voice dialing used in a home gateway system in accordance with one embodiment of the invention.

FIG. 10 is a flow chart of a process of voice dialing used in a home gateway system in accordance with one embodiment of the invention. The process starts, step 200, by receiving an off-hook signal at step 210. Next, a voice command is received by the home gateway system at step 212. When the voice command of step 212 is a call request, a voiced name is received at step 214. A speech recognition process is performed on the voiced name and the recognized name is matched with an associated telephone number at step 216. At step 218 the home gateway system initiates a telephone call over a wireless local loop to the associated telephone number, which ends the process at step 220.

In another embodiment the voiced command is a voice mail request. In this case the home gateway system will play a plurality of voice mail options to the user. The user can then voice a desired choice. In this way the voice mail can be operated by voice commands entirely instead of requiring keypad entries.

In another embodiment the voiced command is an email request. In this case the voice processing system converts the titles of each of the emails in a user's mail box from text to an audio signal. Then the titles are announced to the user. The user then announces his voiced selection. The voice processing system then converts the body of the email to an audio signal and plays the email to the user. This allows the user to interact with his email in at a purely vocal level. In another embodiment the home gateway system first initiates a communication session over the wireless local loop to an email provider. The user's emails (plurality of emails) are then downloaded to the home gateway system.

In yet another embodiment the voice command is a request to forward a user's calls to a predetermined telephone number (predetermined forwarded telephone number).

In this case the home gateway system requests a user voice a code. The home gateway system then performs a speaker verification on the code to verify the user's identity. When the user's identity is verified, the user is allowed to state a voiced command that forwards his call to a predetermined number. This embodiment allows a user to forward his calls using only voiced commands and verifies the user's identity for security.

In another embodiment, the home gateway system is used for conference calls. A first telephone call is established, then a conference call command is given. The command can be a flash hook, a voice command or a touch pad code on the telephone for instance. Next, a second telephone call is connected through a voice bridge. Then the first telephone call is connected through the voice bridge.

Figure 11:
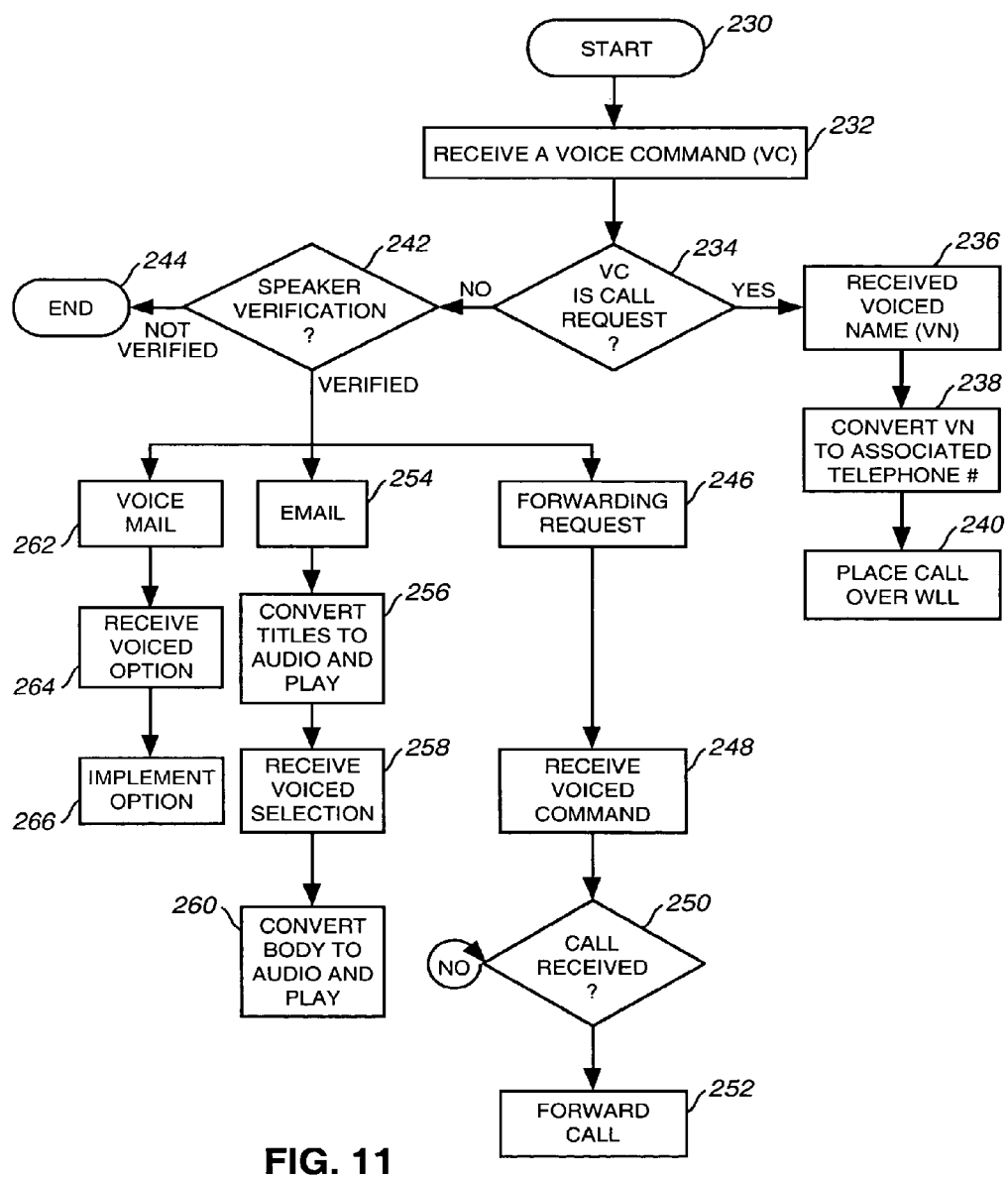
FIG. 11 is a flow chart of a method of operating a home gateway system in accordance with one embodiment of the invention.

FIG. 11 is a flow chart of a method of operating a home gateway system in accordance with one embodiment of the invention. The method starts, step 230, by receiving a voiced command at step 232. Next it is determined if the voiced command is a call request at step 234. When the voiced command is the call request, a voiced name is received at step 236. The voiced name is recognized by a speech recognition system and converted to an associated telephone number at step 238. A call is then placed to the associated telephone number over the wireless local loop (WLL) connection at step 240.

When the voiced command is not a call request, a speaker verification routine is performed at step 242. When the user is not verified, the user is denied access to the home gateway system's features and the process ends, step 244. In another embodiment, the user is asked to input a PIN (Personal Identification Number) when the system cannot verify their voice. When the user is verified, the user selects between the voice mail system, the email system and a forwarding request. When the user selects a forwarding request at step 246, the system receives a voiced command directing that the user's call be directed to a particular number at step 248. The home gateway system then waits for an incoming call at step 250. When an incoming call is received determine if a call forward cancel command is received. When a call forward command is not received, the call is forwarded at step 252.

When the user selects the email system at step 254, the titles of the emails are converted to an audio signal and played to the user at step 256. The user then voices a selection at step 258. The body of the selected email is then converted to an audio signal and played to the user at step 260. In one embodiment the process then allows the user to enter another voice command.

When the user selects the voice mail system at step 262, the voice mail system then plays the options to the user. At step 264 the user states a voiced option. The option is then implemented at step 266. In one embodiment the process then allows the user to enter another voice command.

Figure 12:
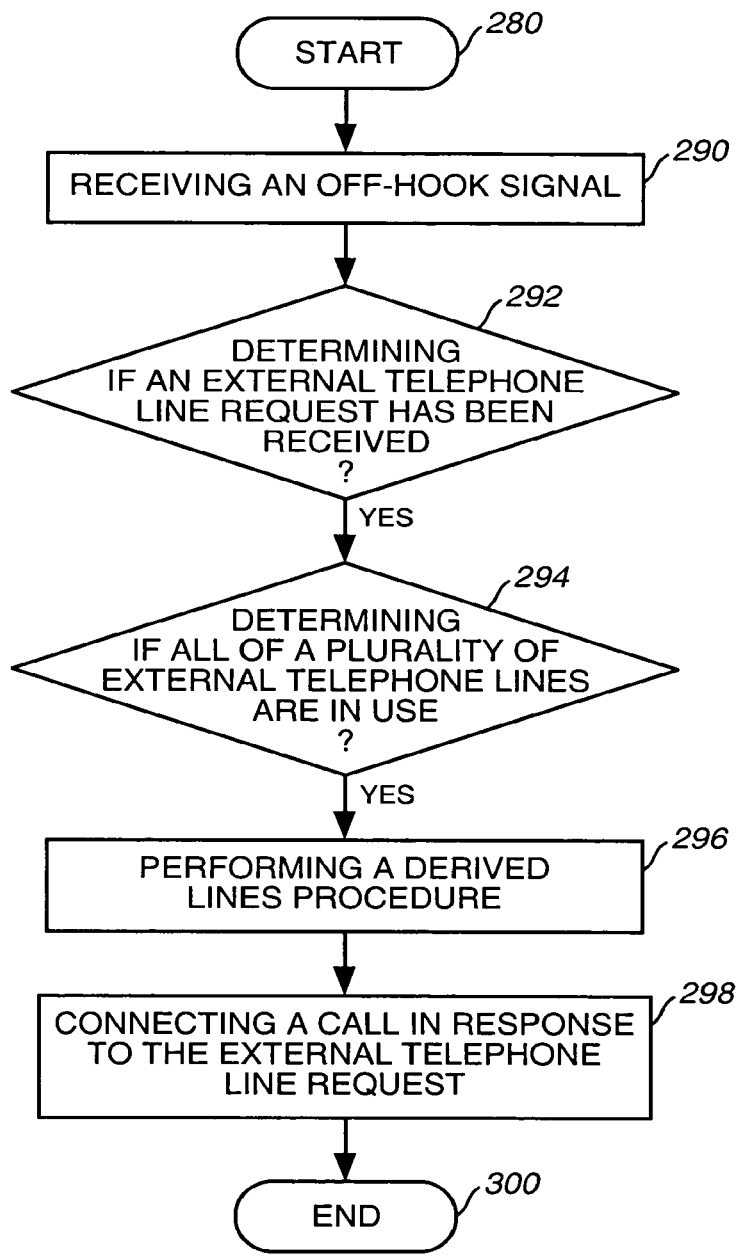
FIG. 12 is a flow chart of a method of using a derived lines procedure in a home gateway system in accordance with one embodiment of the invention.

FIG. 12 is a flow chart of a method of using a derived lines procedure in a home gateway system in accordance with one embodiment of the invention. The process starts, step 280, by receiving an off-hook signal at step 290. Next, it is determined if an external telephone line request has been received at step 292. It is only necessary to perform the derived lines process when an external telephone line request is received. Next, it is determined if all of a plurality of external telephone lines are in use at step 294. When all the external telephone lines are in use, a derived lines procedure is performed at step 296. The derived lines procedure steals bandwidth from the other lines to create another line. At step 298, the call is connected over the derived line, which ends the process at step 300.

Figure 13:
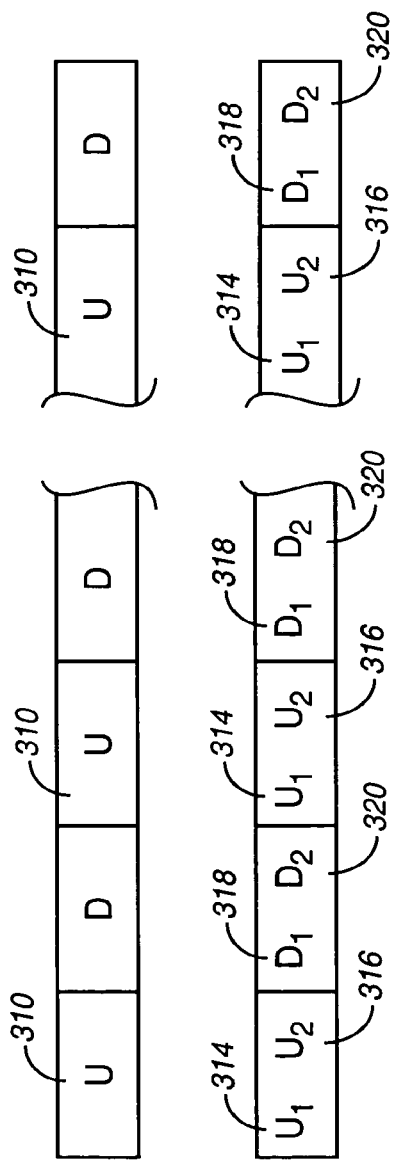
FIG. 13 is a schematic diagram of a derive lines scheme used in a home gateway system in accordance with one embodiment of the invention.

FIG. 13 is a schematic diagram of a derive lines scheme used in a home gateway system in accordance with one embodiment of the invention. In one embodiment, the wireless local loop supports two telephone lines. When both telephone lines are in use, the derive lines technique can divide one of the lines in two and create three lines or the total bandwidth can be reallocated among the three lines. In the embodiment shown in FIG. 13, an up-link line 310 transmits for a time slot. The down link channel 312 also transmits for one time slot. The derive lines scheme data compresses the existing signal by a factor of ½ and also compress the new signal by ½. Then the up-link time slot is divided in half (compressed communication session), so that there is a first uplink time slot (outgoing portion) 314 and a second uplink time slot 316. The down-link time slot is also divided in half, so that there is a first down-link time slot 318 and a second down-link time slot 320. While the derived lines scheme is described in conjunction with a time division multiplexing scheme, it can also be implemented with a wavelength division multiplexing scheme or a code division multiplexing scheme.

Figure 14:
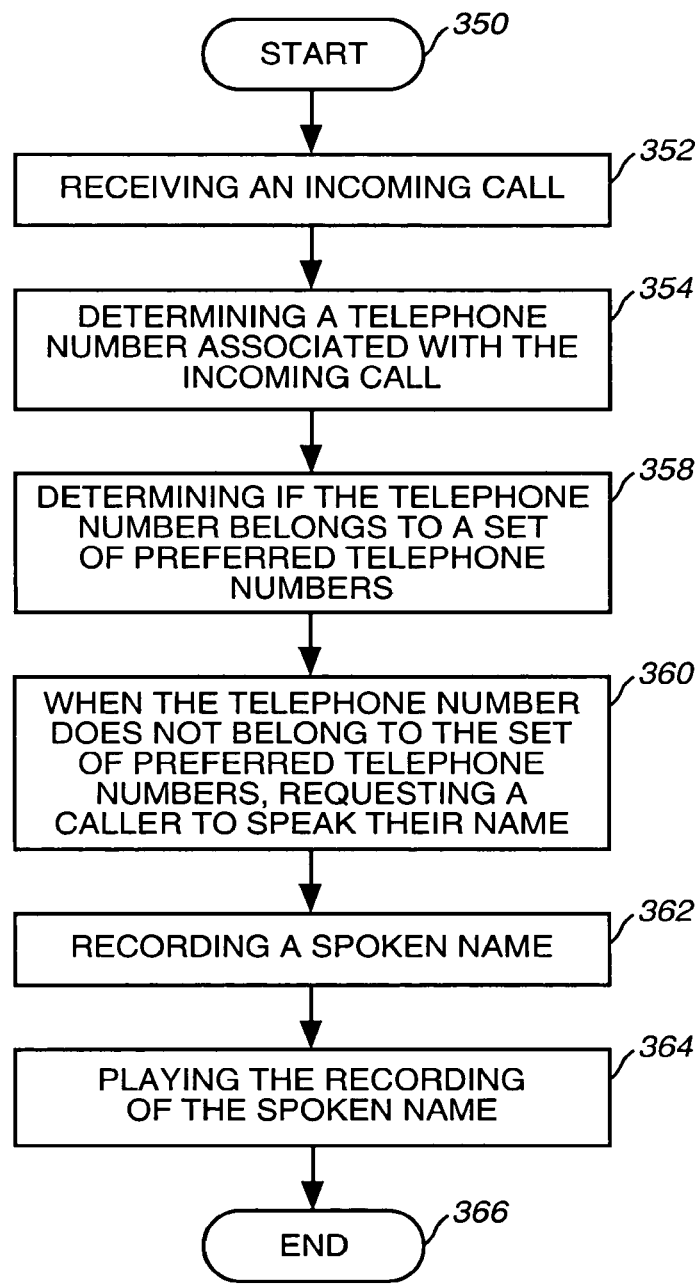
FIG. 14 is a flow chart of a method of operating a home gateway system in accordance with one embodiment of the invention.

FIG. 14 is a flow chart of a method of operating a home gateway system in accordance with one embodiment of the invention. The method starts, step 350, by receiving an incoming call at step 352. Next, a telephone number associated with the incoming call is determined at step 354. At step 358 it is determined if the telephone number belongs to a set of preferred telephone numbers. When the telephone number does not belong to the set of preferred telephone numbers, a caller is requested to speak their name at step 360. At step 362 the spoken name is recorded. The recording of the spoken name is played, at step 364, so the user can determine whether to answer the phone, which ends the process at step 366.

Figure 15:
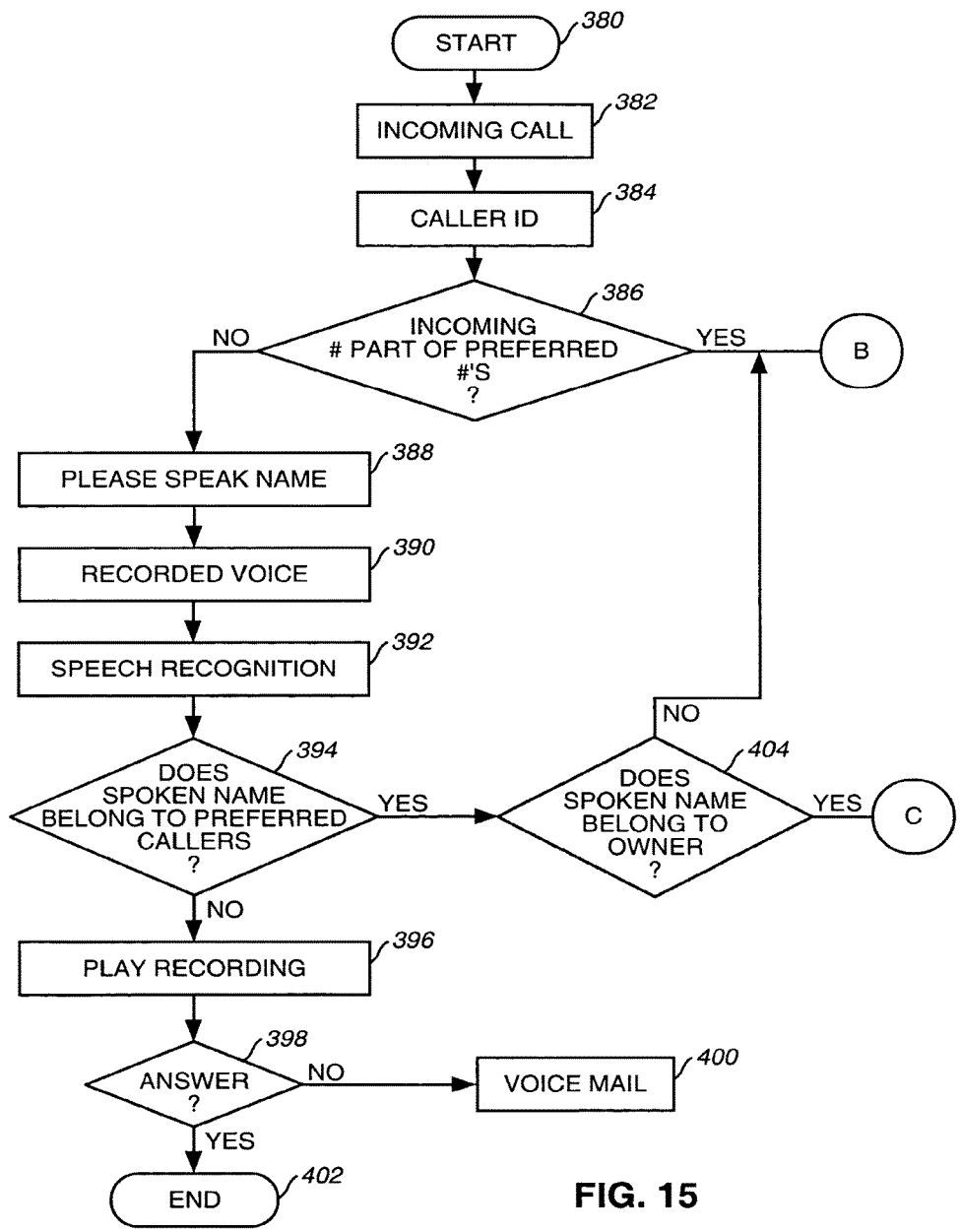
FIGS. 15 & 16 are flow charts of a method of operating a home gateway system in accordance with one embodiment of the invention.
Figure 16:
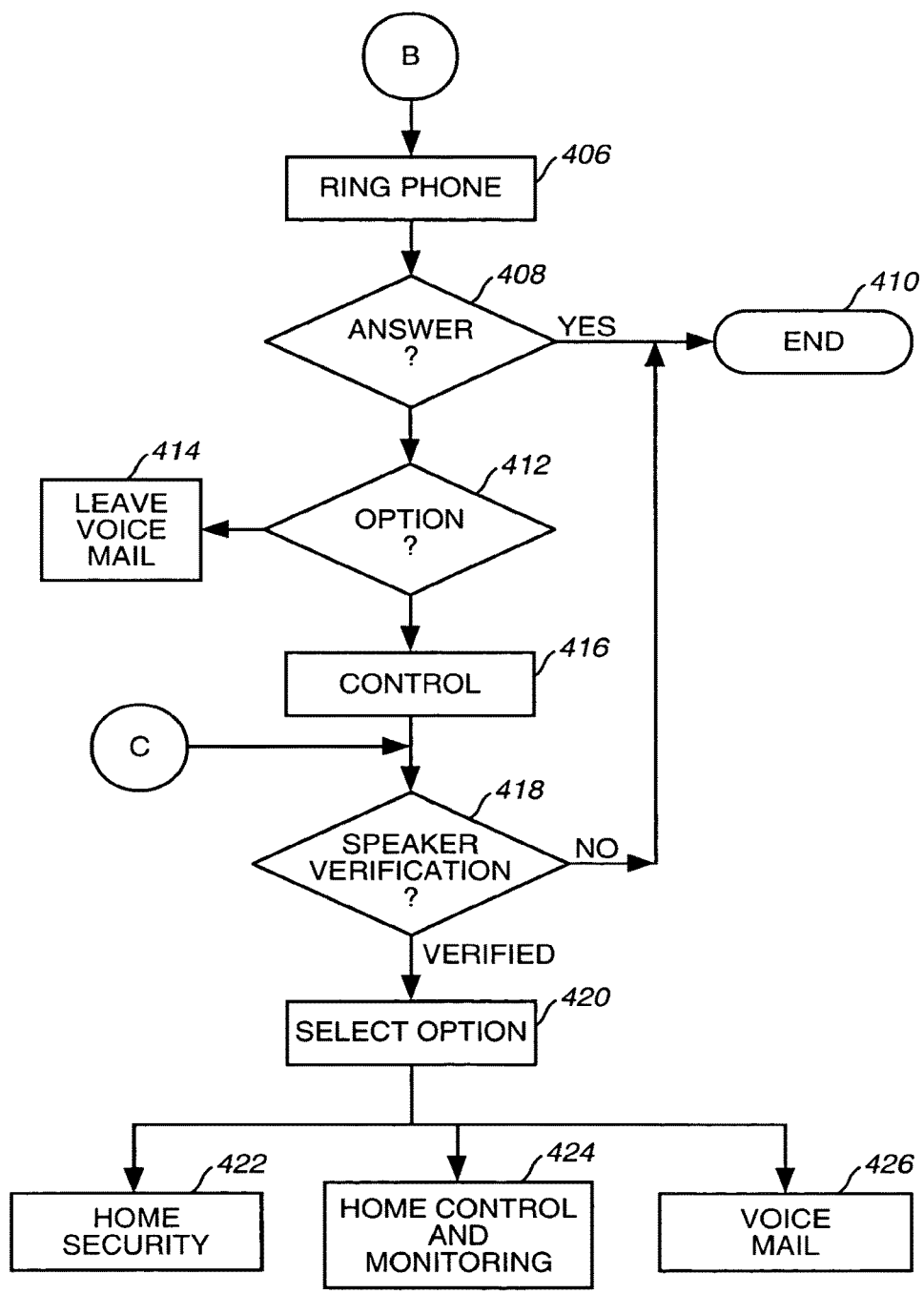

FIGS. 15 & 16 are flow charts of a method of operating a home gateway system in accordance with one embodiment of the invention. The process starts, step 380, by receiving an incoming call at step 382. At step 384 the caller 10 system determines a telephone number associated with the incoming call. Next, it is determined at step 386 if the incoming telephone number is part of a set of preferred set of telephone numbers. When the incoming number is not part of the preferred set of numbers, the caller is asked to speak their name at step 388. A recording of the spoken name is made at step 390. A speech recognition process is performed at step 392. At step 394 it is determined if the spoken name belongs to a set of preferred callers (recognized name). When the spoken name does not belong to the set of preferred callers, the recording of the spoken name is played at step 396. If the user decides not to answer the call, at step 398, the call is sent to voice mail at step 400. In another embodiment the home gateway system just hangs up on the incoming call. If the user decides to answer the call, at step 398, that ends the process at step 402.

When the spoken name does belong to the set of preferred callers at step 394, it is determined if the spoken name belongs to an owner (set of owners) at step 404. When the spoken name does not belong to an owner, at step 404, or the incoming telephone number is part of the preferred telephone numbers, at step 386, the telephone is rung at step 406. When the telephone is answered at step 408, that ends the process at step 410. When the telephone is not answered within a predetermined time at step 408, the user is provided a number of options (plurality of options) at step 412. The options fall into two categories, leaving a voice mail, step 414, or control options at step 416. Before the caller is allowed access to the control options a speaker verification process is performed at step 418. If the speaker cannot be verified, the process ends, step 410. In another embodiment, the user is asked to enter a PIN, if the system cannot verify their voice. When the speaker is verified, they are provided a number of control options at step 420. These options include controlling or monitoring the home security system at step 422, controlling or monitoring the home appliances, lights, etc. at step 424 or controlling the voice mail system at step 426.

Thus, there has been described a home gateway system that integrates a number telephone products and services. The integration of these products and services allows the user to perform a number of sophisticated call screening and processing functions. In addition, the home gateway system combines the home security system and computer networks with the telephone systems to bring about operational synergy's.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A tangible machine readable storage device including instructions that, when executed, cause a machine to perform operations comprising:
   identifying a calling telephone number associated with an incoming call;
   when the calling telephone number is an authorized telephone number, providing a caller of the incoming call access to a plurality of control options of a home automation system via a voice processing system; and when the calling telephone number is an unauthorized telephone number:
   requesting the caller to speak a name of the caller during the incoming call;
   obtaining the name of the caller by performing speech recognition on a response to the request uttered by the caller during the incoming call; and
   when the name corresponds to an authorized person, providing the caller of the incoming call access to the plurality of control options of the home automation system via the voice processing system.

2. The storage device as defined in claim 1, wherein the operations further include playing a recording of the spoken name to a destination party of the incoming call when the name corresponds to an unauthorized person.

3. The storage device as defined in claim 1, wherein the operations further include posting an indicator of the incoming call to a user when the incoming call is received during an existing call.

4. The storage device as defined in claim 1, wherein the operations further include causing a speech synthesizer to play the plurality of control options to the caller.

5. The storage device as defined in claim 1, wherein the operations further include directing the incoming call to a voice mail control system based on a response to the plurality of control options.

6. The storage device as defined in claim 1, further including a voice bridge.

7. The storage device as defined in claim 1, further including a smart card interface to implement at least one of the plurality of control options.

8. The storage device as defined in claim 1, wherein the operations further include when the name corresponds to an unauthorized person, performing speaker verification before providing the caller of the incoming call access to the plurality of control options.

9. A method, comprising:
   identifying, by executing an instruction with a processor, a calling telephone number associated with an incoming call;
   when the calling telephone number belongs to a list of authorized telephone numbers, granting, by executing an instruction with the processor, a caller of the incoming call access to a plurality of control options a home automation system via a voice processing system; and
   when the calling telephone number does not belong to the list of authorized telephone numbers:
      obtaining, by executing an instruction with the processor, an utterance made by the caller in response to a request for a name of the caller, the utterance made during the incoming call;
      obtaining, by executing an instruction with the processor, the name of the caller by performing speech recognition on the utterance;
      determining, by executing an instruction with the processor, whether the name of the caller corresponds to an authorized set of people; and
      when the name of the caller corresponds to one of the authorized set of people, granting, by executing an instruction with the processor, the caller access to the plurality of control options via the voice processing system.

10. A method as defined in claim 9, further including playing the utterance to a destination party of the incoming call when the name does not correspond to one of the authorized set of people.

11. A method as defined in claim 9, further including posting an indicator of the incoming call to a user when the incoming call is received during an existing call.

12. A method as defined in claim 9, further including causing a speech synthesizer to play the plurality of control options to the caller.

13. A method as defined in claim 9, further including directing the incoming call to a voice mail control system based on a selection.

14. The method of claim 9, further including, when the calling telephone number does not belong to the list of authorized telephone numbers and the name of the caller corresponds to one of the authorized set of people, performing a speaker verification before granting the caller access to the control options.

* * * * *